US008196124B2

(12) United States Patent
Eichenberger et al.

(10) Patent No.: US 8,196,124 B2
(45) Date of Patent: *Jun. 5, 2012

(54) SIMD CODE GENERATION IN THE PRESENCE OF OPTIMIZED MISALIGNED DATA REORGANIZATION

(75) Inventors: Alexandre E. Eichenberger, Chappaqua, NY (US); Kai-Ting Amy Wang, North York (CA); Peng Wu, Mt. Kisco, NY (US)

(73) Assignee: International Business Machines Corporation, Armonk, NY (US)

( * ) Notice: Subject to any disclaimer, the term of this patent is extended or adjusted under 35 U.S.C. 154(b) by 957 days.

This patent is subject to a terminal disclaimer.

(21) Appl. No.: 12/196,764

(22) Filed: Aug. 22, 2008

(65) Prior Publication Data

US 2008/0307402 A1    Dec. 11, 2008

Related U.S. Application Data

(63) Continuation of application No. 10/918,996, filed on Aug. 16, 2004, now Pat. No. 7,478,377, which is a continuation-in-part of application No. 10/862,483, filed on Jun. 7, 2004, now Pat. No. 7,386,842.

(51) Int. Cl.
*G06F 9/45* (2006.01)

(52) U.S. Cl. .......................... 717/150; 717/160

(58) Field of Classification Search .................. None
See application file for complete search history.

(56) References Cited

U.S. PATENT DOCUMENTS

| 4,710,872 | A | 12/1987 | Scarborough | 717/160 |
|---|---|---|---|---|
| 5,247,645 | A | 9/1993 | Mirza et al. | 711/5 |
| 5,349,665 | A | 9/1994 | Endo | 717/160 |
| 5,440,687 | A | 8/1995 | Coleman et al. | 709/236 |
| 5,481,746 | A | 1/1996 | Schiffleger et al. | 712/7 |
| 5,522,074 | A | 5/1996 | Endo | 717/150 |
| 5,802,375 | A | 9/1998 | Ngo et al. | 717/160 |
| 5,933,650 | A | 8/1999 | van Hook et al. | 712/2 |
| 5,996,057 | A | 11/1999 | Scales, III et al. | 712/5 |
| 6,113,650 | A | 9/2000 | Sakai | 717/160 |
| 6,202,141 | B1 | 3/2001 | Diefendorff et al. | 712/9 |
| 6,266,758 | B1 | 7/2001 | Van Hook et al. | 712/2 |
| 6,334,176 | B1 | 12/2001 | Scales, III et al. | 712/4 |
| 6,484,255 | B1 | 11/2002 | Dulong | 712/224 |
| 6,550,059 | B1 | 4/2003 | Choe et al. | 717/159 |
| 7,020,873 | B2 | 3/2006 | Bik et al. | 717/156 |
| 7,168,069 | B1 | 1/2007 | Sigmund | 717/140 |

(Continued)

OTHER PUBLICATIONS

Lee et al., "Simple Vector Microprocessors for Multimedia Applications," *Proceedings of the 31st Annual International Symposium on Microarchitecture*, Dec. 1998 (12 pages).

(Continued)

*Primary Examiner* — Lewis A Bullock, Jr.
*Assistant Examiner* — Jue Wang
(74) *Attorney, Agent, or Firm* — VanLeeuwen & VanLeeuwen; Matthew B. Talpis

(57) ABSTRACT

Loop code is generated to execute on Single-Instruction Multiple-Datapath (SIMD) architectures, where the loop operates on datatypes having different lengths. Further, a preferred embodiment of the present invention includes a novel technique to efficiently realign or shift arbitrary streams to an arbitrary offset, regardless whether the alignments or offsets are known at the compile time or not. This technique enables the application of advanced alignment optimizations to runtime alignment. This allows sequential loop code operating on datatypes of disparate length to be transformed ("simdized") into optimized SIMD code through a fully automated process.

10 Claims, 8 Drawing Sheets

U.S. PATENT DOCUMENTS

| | | | | |
|---|---|---|---|---|
| 7,219,212 | B1 | 5/2007 | Sanghavi et al. | 712/6 |
| 7,275,147 | B2 | 9/2007 | Tavares | 712/224 |
| 2003/0120889 | A1 | 6/2003 | Roussel et al. | 711/201 |
| 2003/0167460 | A1 | 9/2003 | Desai et al. | 717/151 |
| 2003/0204840 | A1 | 10/2003 | Wu | 717/158 |
| 2004/0001066 | A1 | 1/2004 | Bik et al. | 345/505 |
| 2004/0003381 | A1 | 1/2004 | Suzuki et al. | 717/150 |
| 2004/0006667 | A1 | 1/2004 | Bik et al. | 711/100 |
| 2004/0025150 | A1 | 2/2004 | Heishi et al. | 717/154 |
| 2004/0098709 | A1 | 5/2004 | Kyo | 717/140 |
| 2005/0097301 | A1 | 5/2005 | Ben-David et al. | 712/22 |
| 2005/0273769 | A1 | 12/2005 | Eichenberger et al. | 717/160 |
| 2005/0273770 | A1 | 12/2005 | Eichenberger et al. | 717/131 |
| 2005/0283773 | A1 | 12/2005 | Eichenberger et al. | 717/160 |
| 2005/0283774 | A1 | 12/2005 | Eichenberger et al. | 717/150 |
| 2005/0289529 | A1 | 12/2005 | Almog et al. | 717/158 |

OTHER PUBLICATIONS

Cheong et al., "An Optimizer for Multimedia Instruction Sets," Stanford University, Aug. 14, 1997.

Krall et al., "Compilation Techniques for Multimedia Processors," International Journal of Parallel Programming, vol. 28, No. 4, pp. 347-361, 2000, http://citeseer.ist.psu.edu/krall00compilation.html.

Sreraman et al., "A Vectorizing Compiler for Multimedia Extensions," *International Journal of Parallel Programming*, 2000 (40 pages).

Bik et al., "Automatic Intra-Register Vectorization for the Intel Architecture," *International Journal of Parallel Programming*, vol. 30, No. 2, Apr. 2002 (p. 65-98).

O'Brien, "Predictive Commoning: A method of optimizing loops containing references to consecutive array elements," published by IBM Thomas J. Watson Research Center, Yorktown Heights, NY, Apr. 26, 1990, pp. 1-12.

Larsen et al., "Increasing and Detecting Memory Address Congruence," *Proceedings of 11th International Conference on Parallel Architectures and Compilation Techniques*, Sep. 2002, 11 pages.

Naishlos, "Vectorizing for a SIMdD DSP Architecture," *Cases '03*, Oct. 30-Nov. 1, 2003, ACM, pp. 2-11.

Shin et al., "Compiler-Controlled Caching in Superword Register Files for Multimedia Extension Architectures," *The Eleventh International Conference on Parallel Architectures and Compilation Techniques*, Charlottesville, VA, Sep. 2002, pp. 1-11, http://moss.csc.ncsu.edu/pact02/papers/shin183.pdf.

Ren et al., "A Preliminary Study on the Vectorization of Multimedia Applications for Multimedia Extensions," published by Department of Computer Science, University of Illinois at Urbana Champaign, Urbana, IL and IBM T.J. Watson Research Center, Yorktown Heights, NY, 2003, pp. 1-15, http://citeseer.ist.psu.edu/ren03preliminary.html.

Eichenberger et al., Vectorization for SIMD Architectures with Alignment Constraints, *PLDI'04*, Jun. 9-11, 2004, p. 82-93.

Chatterjee et al., "Modeling Data-Parallel Programs with the Alignment-Distribution Graph," *6th Annual Workshop on Languages and Compilers for Parallelism*, Aug. 1993, 28 pages.

Allen et al., "Automatic Translation of FORTRAN Programs to Vector Form," *ACM Transactions on Programming Languages and Systems*, v. 9, No. 4, Oct. 1987, p. 491-542.

*AltiVec™ Technology Programming Interface Manual*, 1999, 262 pages.

Arafeh, Bassel R., "Vectorization and parallelization interactive assistant," 1988, ACM, pp. 573-577.

McKenney et al., "Generating Parallel Code for SIMD Machines," 1992, ACM, pp. 59-73.

Pajuelo et al., "Speculative Dynamic Vectorization," 2002, IEEE, pp. 271-280.

Scarborough et al., "A Vectorizing Fortran Compiler," Mar. 1986, IBM Journal of Research and Development, vol. 30, Issue 2, pp. 163-171.

Levine et al., "A Comparative Study of Automatic Vectorizing Compilers," 1991, Parallel Computing, vol. 17.

Lee et al., "Automatic Data and Computation Decomposition on Distributed Memory Parallel Computers," Jan. 2002, ACM Transactions on Programming Languages and Systems, vol. 24, No. 1.

Cukic et al., "Automatic Array Alignment as a Step in Hierarchical Program Transformation," Apr. 1994, Proceedings of Eighth International Parallel Processing Symposium.

Larsen et al., "Exploiting Superword Level Parallelism with Multimedia Instruction Sets," 2000, PLDI 2000, pp. 145-156.

Lorenz et al., "Energy Aware Compilation for DSPs with SIMD Instructions," 2002, LCTES'02-SCOPES'02, pp. 94-101.

Bik et al., "Efficient Exploitation of Parallelism on Pentium III and Pentium 4 Processor-Based Systems," Intel Technology Journal Q1, 2001.

Schouten et al., "Inside the Intel Compiler," Feb. 2003, Linux Journal, vol. 2003, Issue 106.

Office action for pending U.S. Appl. No. 10/919,005, mailed Jan. 23, 2009, 11 pages.

```
for (i = 0; i < 100; i++) {
   a[i+3] = b[i+1] + c[i+2];
}
```

*Figure 1*

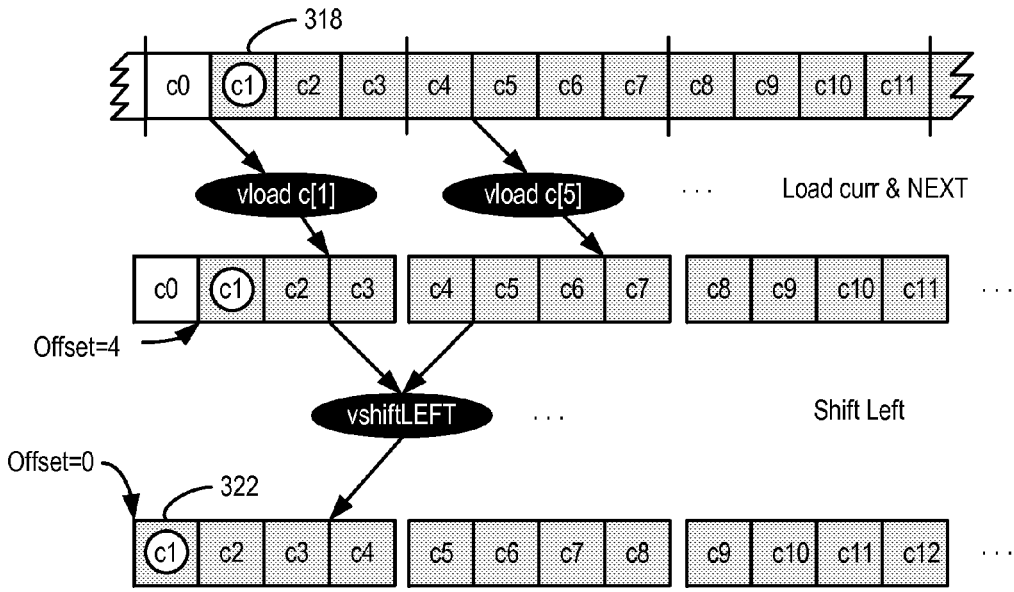

*Figure 3D*

NormalizeStream(n)

1  if $n \equiv \text{VSTORE}(addr(i), src)$
2    return VSTORE(NormalizeStream($src$))
3  if $n \equiv \text{VLOAD}(addr(i))$ return VLOAD($addr(i)$)
4  if $n \equiv \text{VSTREAMSHIFT}(src, to)$
5    $src' \leftarrow$ PrependStream($src, to$)
6    return VSHIFTSTREAM(NormalizeStream($src'$), 0)
7  if $n \equiv \text{VOP}(src_1, \ldots, src_n)$
8    for $(k = 1..n)$ $src'_k \leftarrow$ NormalizeStream($src_k$)
9    return VOP($src'_1, \ldots, src'_n$)

PrependStream(n,x)

10  if $n \equiv \text{VLOAD}(addr(i))$
11    return VLOAD($addr(i) - x$)
12  if $n \equiv \text{VOP}(src_1, \ldots, src_n)$
13    return VOP(PrependStream($src_1, x$), ..., PrependStream($src_n, x$))
14  if $n \equiv \text{VSHIFTSTREAM}(src, to)$
15    return VSHIFTSTREAM(PrependStream($src, x$), $(to - x) \bmod V$)

*Figure 4*

SIMD CODE GENERATION IN THE PRESENCE OF OPTIMIZED MISALIGNED DATA REORGANIZATION

CROSS-REFERENCE TO RELATED APPLICATIONS

This application is a continuation application of U.S. Non-Provisional patent application Ser. No. 10/918,996, entitled "SIMD Code Generation in the Presence of Optimized Misaligned Data Reorganization," filed on Aug. 16, 2004, and issued as U.S. Pat. No. 7,478,377 on Jan. 13, 2009, which is a continuation in part of U.S. Non-Provisional patent application Ser. No. 10/862,483, entitled "System and Method for Efficient Data Reorganization to Satisfy Data Alignment Constraints," filed on Jun. 7, 2004, and issued as U.S. Pat. No. 7,386,842 on Jun. 10, 2008.

BACKGROUND OF THE INVENTION

1. Technical Field

The present invention relates in general to a system and method for vectorizing loop code for execution on Single Instruction Multiple Datapath (SIMD) architectures that impose strict alignment constraints on the data.

2. Description of the Related Art

Multimedia extensions (MMEs) have become one of the most popular additions to general-purpose microprocessors. Existing multimedia extensions can be characterized as Single Instruction Multiple Datapath (SIMD) units that support packed fixed-length vectors. The traditional programming model for multimedia extensions has been explicit vector programming using either (in-line) assembly or intrinsic functions embedded in a high-level programming language. Explicit vector programming is time-consuming and error-prone. A promising alternative is to exploit vectorization technology to automatically generate SIMD codes from programs written in standard high-level languages.

Although vectorization has been studied extensively for traditional vector processors decades ago, vectorization for SIMD architectures has raised new issues due to several fundamental differences between the two architectures. See, e.g., Ren, Gang, et al. A Preliminary Study on the Vectorization of Multimedia Applications. In 16*th International Workshop of Languages and Compilers for Parallel Computing*. October 2003. To distinguish between the two types of vectorization, we refer to the latter as simdization. One such fundamental difference comes from the memory unit. The memory unit of a typical SIMD processor bears more resemblance to that of a wide scalar processor than to that of a traditional vector processor. In the VMX instruction set found on certain POWERPC microprocessors (produced by International Business Machines Corporation and Motorola, Inc.), for example, a load instruction loads 16-byte contiguous memory from 16-byte aligned memory, ignoring the last 4 bits of the memory address in the instruction. The same applies to store instructions. In this paper, architectures with alignment constraints refer to machines that support only loads and stores of register-length aligned memory.

There has been a recent spike of interest in compiler techniques to automatically extract SIMD parallelism from programs. See, e.g., LARSEN, Samuel, et al. Exploiting Superword Level Parallelism with Multimedia Instruction Sets. In *Proceedings of SIGPLAN Conference on Programming Language Design and Implementation*. June 2000, pp. 145-156; BIK, Aart, et al. Automatic Intra-Register Vectorization for the Intel Architecture. *Int. J. of Parallel Programming*. April 2002, vol. 30, no. 2, pp. 65-98; KRALL, Andreas, et al. Compilation Techniques for Multimedia Processors. *Int. J. of Parallel Programming*. August 2000, vol. 28, no. 4, pp. 347-361; SRERAMAN, N., et al. A Vectorizing Compiler for Multimedia Extensions. *Int. J. of Parallel Programming*, August 2000, vol. 28, no. 4, pp. 363-400; LEE, Corinna G., et al. Simple Vector Microprocessors for Multimedia Applications. In *Proceedings of International Symposium on Microarchitecture*. 1998, pp. 25-36; and NAISHLOS, Dorit, et al. Vectorizing for a SIMD DSP Architecture. In *Proceedings of International Conference on Compilers, Artchitectures, and Synthesis for Embedded Systems*. October 2003, pp. 2-11. This upsurge was driven by the increasing prevalence of SIMD architectures in multimedia processors. Two principal techniques have been used, the traditional loop-based vectorization pioneered for vector supercomputers (e.g., ALLEN, John Randal, et al. Automatic Translation of Fortran Programs to Vector Form. *ACM Transactions on Programming Languages and Systems*. October 1987, vol. 4, pp. 491-542; and ZIMA, Hans, et al. Supercompilers for Parallel and Vector Computers. Reading, Mass.: Addison-Wesley/ACM Press, 1990. ISBN 0201175606) and the unroll-and-pack approach first proposed by Larsen and Amarasinghe in LARSEN, Samuel, et al. Exploiting Superword Level Parallelism with Multimedia Instruction Sets. In *Proceedings of SIGPLAN Conference on Programming Language Design and Implementation*. June 2000, pp. 145-156.

The alignment constraints of SIMD memory units present a great challenge to automatic simdization. Consider the code fragment in FIG. 1 where integer arrays a, b, and c are aligned (An aligned reference means that the desired data reside at an address that is a multiple of the vector register size). Although this loop is easily vectorizable for traditional vector processors, it is non-trivial to simdize it for SIMD architectures with alignment constraints. Hence, the most commonly used policy today is to simdize a loop only if all memory references in the loop are aligned.

A very extensive discussion of alignment considerations is provided by LARSON, Samuel, et al. Increasing and Detecting Memory Address Congruence. In *Proceedings of 11th International Conference on Parallel Architectures and Compilation Techniques*. September 2002. However, LARSON is concerned with the detection of memory alignments and with techniques to increase the number of aligned references in a loop, whereas our work focuses on generating optimized SIMD codes in the presence of misaligned references. The two approaches are complementary. The use of loop peeling to align accesses was discussed in LARSON as well as in the aforementioned BIK reference. The loop peeling scheme is equivalent to the eager-shift policy with the restriction that all memory references in the loop must have the same misalignment. Even under this condition, our scheme has the advantage of generating simdized prologue and epilogue, which is the by-product of peeling from the simdized loop.

Direct code generation for misaligned references have been discussed by several prior works. The vectorization of misaligned loads and stores using the VIS instruction set is described in CHEONG, Gerald, et al. An Optimizer for Multimedia Instruction Sets. In *Second SUIF Compiler Workshop*. August 1997. The aforementioned BIK, et al. reference described a specific code sequence of aligned loads and shuffle to load memory references that cross cache line boundaries, which is implemented in Intel's compiler for SSE2. However, their method is not discussed in the context of general misalignment handling.

The VAST compiler, a commercial product by Crescent Bay Software, has some limited ability to simdize loops with multiple misaligned references, unknown loop bounds, and runtime alignments, and exploit the reuse when aligning a steam of contiguous memory. The VAST compiler, however, produces less than optimal simdized code, as its highly generalized scheme for handling mis-alignment can produce additional compilation overhead.

An interesting simdization scheme using indirect register accesses is discussed in the aforementioned NAISHLOS, et al. reference. However, their method is specific to the eLite processor, which supports more advanced vector operations (such as gather and scatter operations) than are available on typical MME processors. In SHIN, Jaewook, et al. Compiler-Controlled Caching in Superword Register Files for Multimedia Extension Architectures. In *Proceedings of International Conference on Parallel Architectures and Compilation Techniques*. September 2002, register packing and shifting instructions were used to exploit temporal and spatial reuse in vector registers. However, their work does not address alignment handling.

Another work that is of note, but which is in the area of compiling for distributed memory systems as opposed to SIMD architectures, is CHATTERJEE, Siddhartha, et al. Modeling Data-Parallel Programs with the Alignment-Distribution Graph. *J. of Programming Languages*. 1994, vol. 2, no. 3, pp. 227-258.

In U.S. patent application Ser. No. 10/862,483 (hereinafter EICHENBERGER) a generic alignment handling framework that simdizes loops with arbitrary misalignments is disclosed. According to this framework, contiguous data accessed in a loop is viewed as streams, and aligning data to satisfy alignment constraints is modeled as shifting streams. Consider, for example, the (C-language) loop in FIG. 1 where the base of arrays a, b, and C are aligned (An aligned reference means that the desired data reside at an address that is a multiple of the vector register size). The grey boxes in FIG. 2A highlight the three memory streams represented by references a[i+2], b[i+1], and c[i+3] over the lifetime of the loop. Focusing on the first value of each stream, i.e., data accessed by the i=0 loop iteration, one can see from FIG. 2A that the a[2], b[1], and c[3] values are all misaligned with respect to each others. A valid simdization requires streams involved in a computation to have matching alignments. This condition can be satisfied by realigning misaligned streams using stream shift operations. FIG. 2B shows a minimum cost simdization of the loop in FIG. 1 that involves two shifts that respectively shifts the b[i+1] and c[i+3] memory streams to the alignment of the a[i+2] memory stream. The three streams have then the same alignment, satisfying the alignment constraints of the vadd and vstore operations.

Although runtime alignment is handled in the framework of EICHENBERGER, it is not as efficient as the handling of compile time alignment. Due to code generation issues, stream shifts must be implemented as either stream shift left or stream shift right. In the presence of runtime alignment, the relative alignment of 2 streams is clearly unknown at compile time. In such cases, the approach taken in EICHENBERGER is to shift left each input memory stream to the leftmost position (register offset 0), perform the computation, and shift right the result to the store memory alignment. For example, in the loop in FIG. 1, this runtime shift policy is equivalent to the simdization shown in FIG. 2C where 3 shifts are required instead of 2, increasing the alignment overhead by 50%.

In addition, existing technologies fail to adequately address the issue of data-length conversion in the generation of vectorized code for SIMD processors, where the source or destination data streams are misaligned with respect to each other. For example, one may write a loop that adds a vector of 16-bit "short" integers to a vector of 32-bit "long" integers to obtain a result that is a vector of 32-bit integer values (e.g., the case where b is an array of short integers and a and C are arrays of long integers in the loop of FIG. 1).

SUMMARY

The present invention generates loop code to execute on Single-Instruction Multiple-Datapath (SIMD) architectures, where the loop operates on datatypes having different lengths. Arbitrary streams are efficiently realigned or shifted to an arbitrary offset, regardless whether the alignments or offsets are known at the compile time or not. This technique enables the application of advanced alignment optimizations to runtime alignment. Length conversion operations, for packing and unpacking data values, are included in the alignment handling framework. These operations are formally defined in terms of standard SIMD instructions that are readily available on various SIMD platforms. This allows sequential loop code operating on datatypes of disparate length to be transformed ("simdized") into optimized SIMD code through a fully automated process.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings.

FIG. 1 is a diagram of a loop in a C-like programming language that may be simdized/vectorized in accordance with a preferred embodiment of the present invention;

FIG. 3D is a diagram depicting a stream shift operation corresponding to the shift depicted in FIG. 3B, but in accordance with a preferred embodiment of the present invention, in which prepended values are utilized to ensure that the resulting generated code performs a left shift operation;

FIG. 4 is a diagram depicting an algorithm in which a data reorganization graph is recursively traversed and all stream shift operations are normalized such that the resulting generated code performs only left shift operations;

DETAILED DESCRIPTION

1. Preliminary Matters

In this section, an overview of the alignment handling framework of the incorporated EICHENBERGER application is provided, some of the key concepts that a preferred embodiment of the present invention is built upon are highlighted.

1.1. Alignment Constraints of a Valid Simdization

Figure 1:
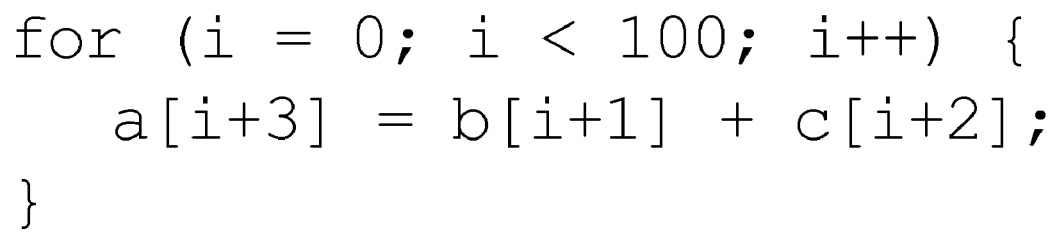

A valid vectorization for traditional vector units is only constrained by dependencies. This is no longer sufficient when simdizing for architectures with alignment constraints. Consider the loop a[i+2]=b[i+1]+c[i+3] in FIG. 1. Since there is no loop-carried dependence, a straightforward vectorization simply involves replacing scalar operations by corresponding vector operations. The generated code, however, will execute incorrectly if the hardware has alignment constraints. For example, in the VMX instruction set, due to the address truncation effect, a vector load from address of b[1] (i.e., vload b[1]) actually loads b[0] . . . b[3], instead of the desired b[1] . . . b[4]. Similarly, vload c[3] loads c[0] . . . c[3], instead of the desired C[3] . . . c[6]. Adding the two vectors yields b[0]+c[0] . . . b[3]+c[3], which is clearly not the result specified by the original b[i+1]+c[i+3] computation. Therefore, for hardware platforms with strict alignment requirements, a valid simdization must satisfy additional alignment constraints:

When simdizing a store operation, the byte offset of the data to be stored in the vector register must match the memory alignment of the original store address.

When simdizing a binary operation, data involved in the original computation must reside at the same byte offset in their respective vector registers.

1.2 Stream and Stream Offset

The byte offset of data in a vector register is the key to expressing alignment constraints of a valid simdization. To capture the byte offset property within a loop, the abstraction of stream is introduced. There are two types of streams, a memory stream that represents the sequence of contiguous memory locations accessed by a memory reference over the lifetime of a loop, and a register stream that represents the sequence of consecutive registers produced by a SIMD operation over the lifetime of a loop.

Vector operations in a loop can be viewed as operations over streams. A vector load consumes a memory stream and produces a register stream. As data is read from memory in discrete chunks of 16 bytes, extra values may be introduced at the beginning and the end of a register stream. To indicate the boundaries of a register stream, the concept of a stream offset is introduced. The stream offset is defined as the byte offset of the first desired value in the first register of a register stream.

Figure 2A:
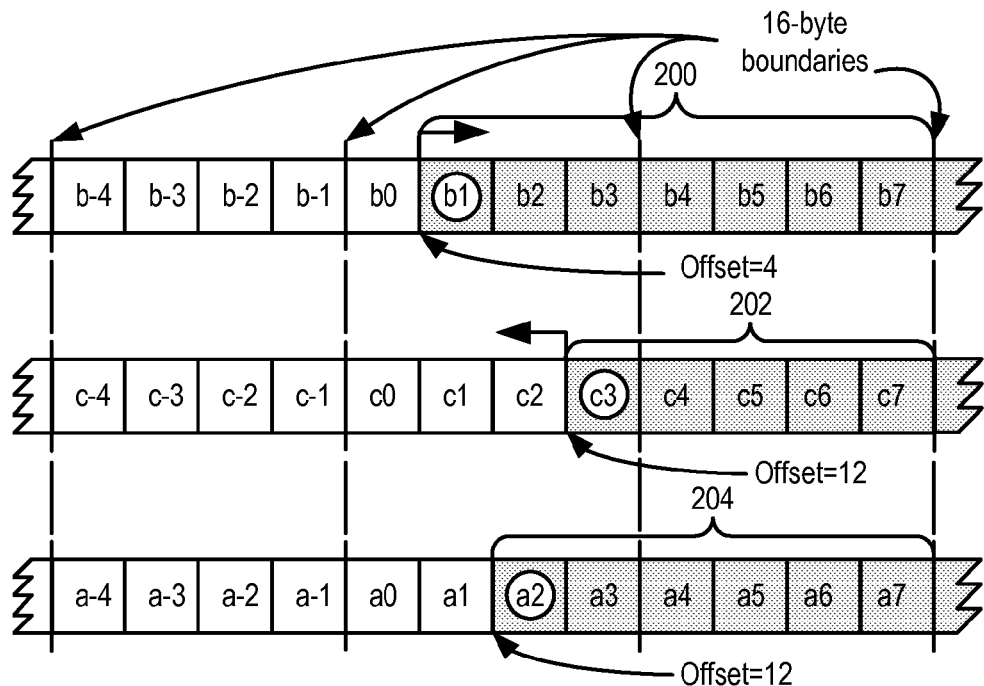
FIG. 2A is a diagram depicting a memory-misaligned set of data streams involved in a loop.
Figure 2B:
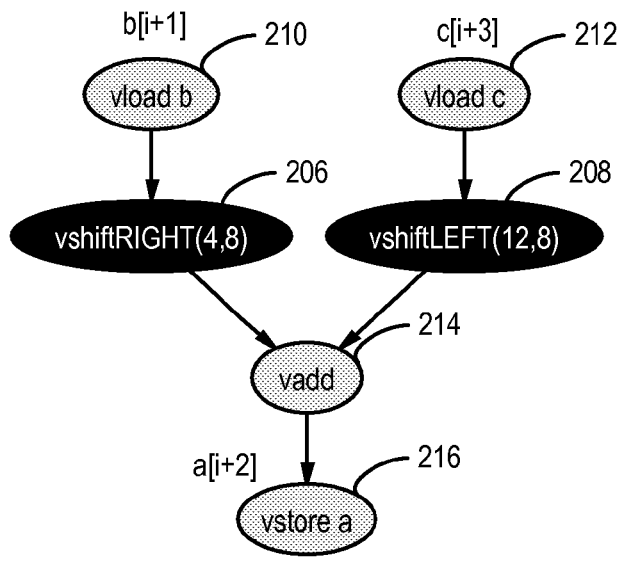
FIG. 2B is a data reorganization graph representing a set of operations performed in simdized loop code generated according to the teachings of the incorporated EICHENBERGER reference using an eager-shift realignment policy.

Note that the stream offset of a register stream generated by of a vector load is dictated by the alignment of the input memory stream. The alignment of a memory stream is the alignment of the first element of the memory stream, namely the byte memory address of the first element module the byte width of the SIMD unit. For example, in FIG. 2B, the stream offset of vload b[i+1] (vload operation 210) is 4. Conversely, a vector store consumes a register stream and produces a memory stream where the offset of the input register stream must match the alignment of the memory stream. Finally, all other vector operations consume register streams with matching offsets and produce a register stream with the same offset.

1.3 Stream Shift and Alignment Policies

A valid simdization requires the offsets of register streams involved in the computation to satisfy alignment constraints. In the presence of misalignments, this property is only achievable by judiciously inserting data reorganization operations to enforce the desired stream offset. The stream shift operation, vshiftstream(S, c), is introduced for this purpose. vshiftstream(S, c) shifts all values of a register stream S across consecutive registers of the stream to an offset of c. Note that, once the first element of a stream satisfies the alignment constraints, the rest of the stream also satisfies the alignment constraints. There are several policies to generate a valid simdization, each of which is discussed in greater detail in the incorporated EICHENBERGER application.

Figure 2C:
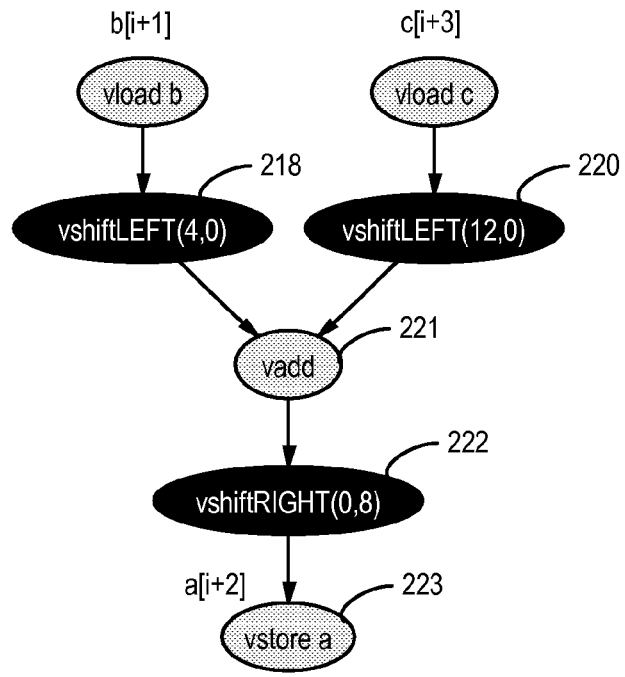
FIG. 2C is a data reorganization graph representing a set of operations performed in simdized loop code generated according to the teachings of the incorporated EICHENBERGER reference using an zero-shift realignment policy.

Zero-Shift Policy This policy shifts each misaligned load stream to 0, and shifts the register stream to be stored to the alignment of the store address. The simdization in FIG. 2C uses the zero-shift policy. It is the least optimized as it inserts a stream shift for each misaligned memory stream. Left shift operation 218 shifts the "b" stream left by one value (4 bytes) to offset 0, and left shift operation 220 shifts the "C" stream left by three values (12 bytes) to offset 0. After addition operation 221, the result is shifted right two values (8 bytes) by right shift operation 222 from offset 0 to offset 8, for storage (store operation 223).

Eager-Shift Policy This policy shifts each load directly to the alignment of the store. The simdization in FIG. 2B uses this policy. In a preferred embodiment, eager-shift is the default policy for compile time alignment. Right shift operation 206 shifts the "b" stream right 4 bytes to place the "b" stream in at the proper alignment for storing the result (in "a"). Likewise, left shift operation 208 shifts the "C" stream left 4 bytes to place the "C" stream in at the proper alignment for storing the result (in "a"). The result of addition operation 214 can then be directly stored into memory for array "a" (store operation 216).

Lazy-Shift Policy This policy is based on the eager-shift policy but pushes the shift as close to the root of the expression tree as possible. Consider the example of a[i+3]=b[i+1]+c[i+1]. This policy exploits the fact that b[i+1] and c[i+1] are relatively aligned, and thus can be safely operated on as is. Therefore, only the result of the add needs to be shifted so as to match the alignment of the store.

Dominant-Shift Policy This policy further reduces the number of stream shifts by shifting register streams to the most dominant stream offset in an expression tree.

2. Efficient Runtime Alignment Handling

In this section, an intuitive explanation of the approach applied in a preferred embodiment of the present invention is provided in Section 2.1. Then, the overall simdization framework in described in Section 2.2. Section 2.3 describes an algorithm to transform an arbitrary stream shift to a shift left, and the correctness of this algorithm is proved in Section 2.4.

Note that all examples in this section have compile-time alignments, for simplicity. It will be demonstrated, however, that the code generation algorithm employed in a preferred embodiment of the present invention never uses specific properties of their values. Thus, this algorithm is suitable for runtime alignment as well.

2.1. An Intuitive Example

Figure 3A:
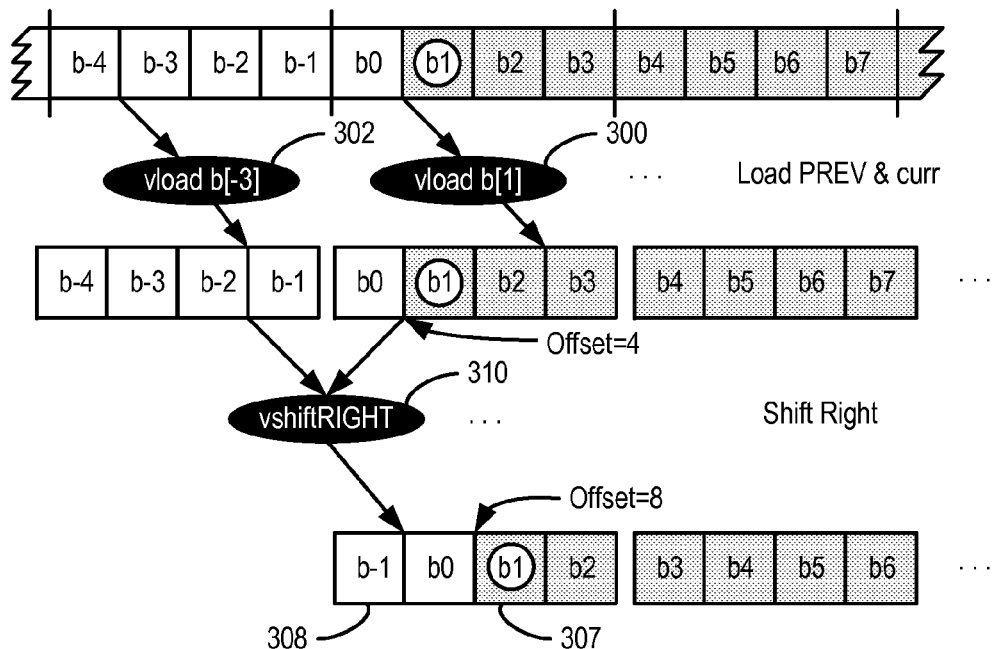
FIG. 3A is a diagram depicting a stream shift operation according to the manner described in the incorporated EICHENBERGER reference, wherein the stream shift operation shifts a data stream to the right.
Figure 3B:
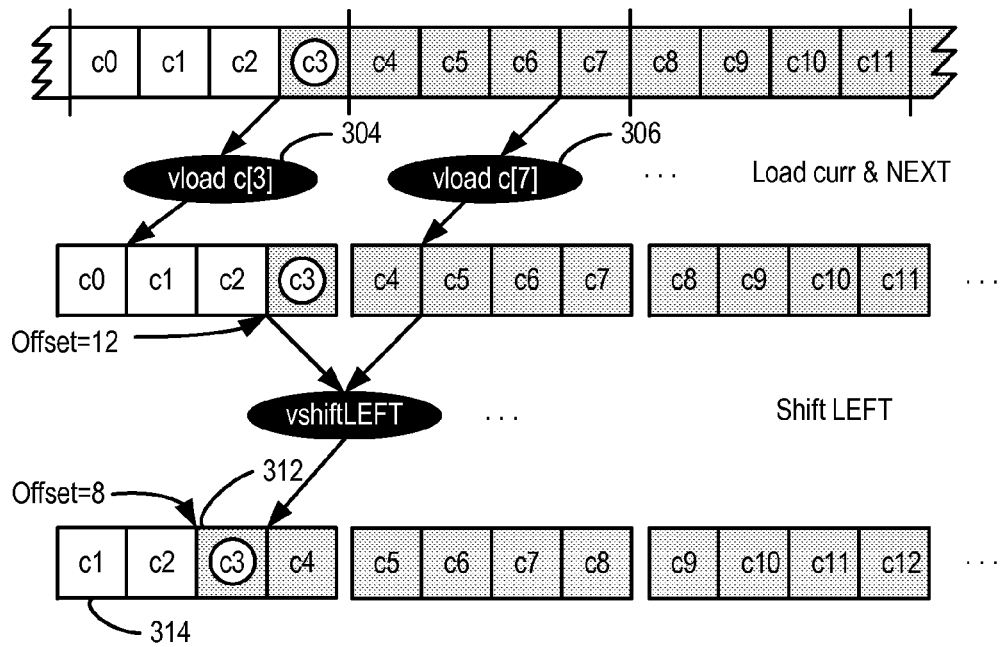
FIG. 3B is a diagram depicting a stream shift operation according to the manner described in the incorporated EICHENBERGER reference, wherein the stream shift operation shifts a data stream to the left.

Consider the initial example of a[i+2]=b[i+1]+c[i+3]. Given the data layout in FIG. 2A, memory streams a[i+2] (data stream 204), b[i+1] (data stream 200), and c[i+3] (data stream 202) have three distinct alignments, 8, 4, and, 12, respectively. Using the eager-shift policy, a minimum cost simdization of the loop involves two shifts, i.e., a shift stream of vload b[i+1] from its original offset of 4 to 8, as depicted in FIG. 3A, and a shift stream of vload c[i+3] from offset 12 to 8, as shown in FIG. 3B.

While this approach works well for stream offsets known at compile time, it does not work for runtime alignment for the following reason. Generally, shifting a stream from offset x to offset y corresponds to a right shift when $x \leq y$ and a left shift when $x \geq y$. When generating codes for a right shift (as in FIG. 3A), one must combine values from the current register (e.g., vload b[1] operation 300) with values from the previous register (e.g., vload b[−3] operation 302). Contrasting this to the algorithm for a left shift (as in FIG. 3B), one must combine the values from the current register (e.g., vload c[3] operation 304) with values from the next register (e.g., vload c[7] operation 306). Thus, when a stream offset is known only at runtime, the compiler cannot determine whether to generate codes that shift a stream left or right.

A key insight is to realize that this issue occurs because one is focusing on the first value of a stream. Consider, then, the case in which one focuses instead on a value before the first element, specifically on the value that is at offset zero of the register containing the first element after the shifting. For example, in FIG. 3A, the first value of the stream is b[1] (value 307), so b[−1] (value 308) is the value that will be at offset zero after shifting the stream to offset 8. Similarly in FIG. 3B, the first value of the stream is c[3] (value 312), so c[1] (value 314) will land at offset zero in the shifted register stream. It should be noted that the new values can be mechanically derived from the original first values. They are simply the values that are 8 bytes (i.e., precisely the destination offset of the stream shift) before the original first values.

Figure 3C:
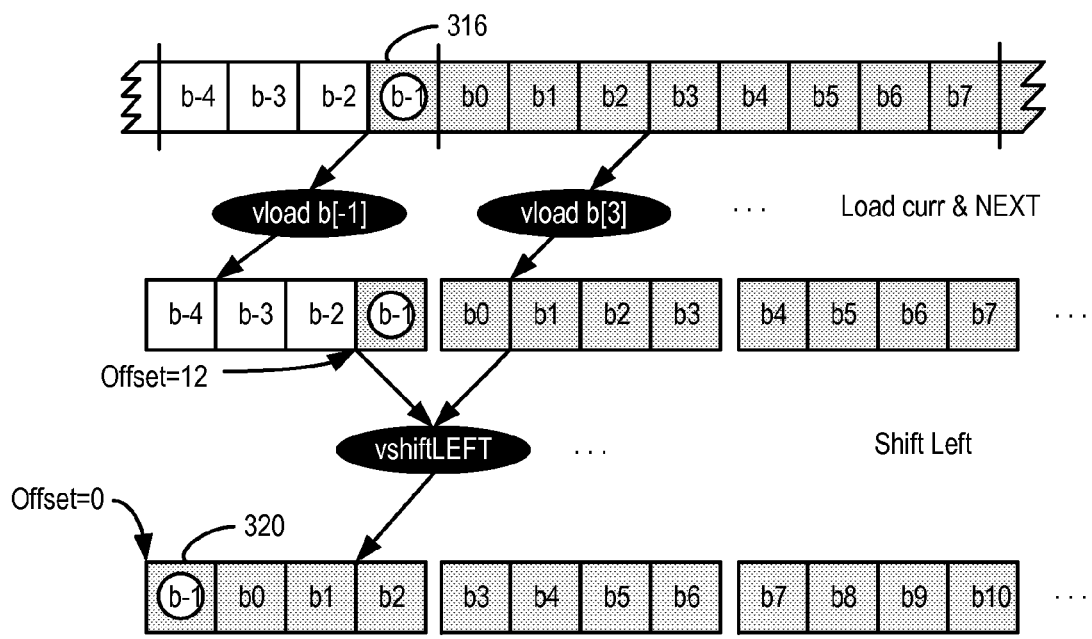
FIG. 3C is a diagram depicting a stream shift operation corresponding to the shift depicted in FIG. 3A, but in accordance with a preferred embodiment of the present invention, in which prepended values are utilized to ensure that the resulting generated code performs a left shift operation.

Suppose one focuses, now, on two new streams that are constructed by prepending a few values to the original b[i+1] and c[i+3] streams so that the new streams start at, respectively, b[−1] (value 316) and c[1] (value 318). These new streams are shown in FIGS. 3C and 3D with the prepended values in light grey. Using the same definition of the stream offset as before, the offsets of the new streams are 12 and 4 bytes, respectively.

By definition, the newly prepended streams will be shifted to offset zero. The shifted new streams yield the same sequence of registers as that produced by shifting the original stream (highlighted with dark grey box with light grey circle), as confirmed by visual inspection of the outcome of FIGS. 3A and 3C as well as FIGS. 3B and 3D. This holds because the initial values of the new streams were selected precisely as the ones that will land at offset zero in the shifted version of the original streams. Since shifting any stream to offset zero is a left shift, this prepending and shifting operation effectively transforms an arbitrary stream shift into a shift left, as shown in FIGS. 3C and 3D.

2.2. Overview of the Simdization Framework

Now an overview of the overall simdization framework that the stream shift algorithm is based upon is provided. The framework that contains three phases:

Data reorganization phase. This phase takes, as input, an expression tree and generate a tree with generic SIMD operations as well as stream shifts that are inserted to satisfy the alignment constraints of the simdized operations. The augmented expression tree is called a data reorganization graph, such as the ones shown in FIGS. 2B and 2C. Different shift placement policies can be applied to minimize the number of shifts generated.

Shift normalization phase. This phase transforms all stream shifts in a data reorganization graph to stream left shifts. The output is still a data reorganization graph.

Code generation phase. This phase takes a data reorganization graph as input and maps generic SIMD operations and left shift operations to machine instructions. Specifically, the algorithm maps vshiftleft to native permutation instructions that "shifts" across a pair of vector registers, e.g., vec_perm on VMX. This phase also addresses issues such as resulting loads when shifting a stream, handling unknown loop counts and multiple statements, and efficient prologue/epilogue generation.

Of primary importance to a preferred embodiment of the present invention is the shift normalization phase that converts arbitrary stream shifts to stream shift left. The other two phases function essentially as described in the incorporated EICHENBERGER reference. Therefore, the rest of the section will focus on the shift normalization algorithm.

2.3. Transforming a Stream Shift to Shift Left

As illustrated in Section 2.1, an arbitrary stream shift, vshiftstream(S, x), can be converted to a stream shift left by shifting a derived stream, one that starts exactly x bytes before the first value of S, to offset zero. For the ease of description, introduce two operators are introduced: Prepend(S, x), which prepends x bytes at the beginning of stream S, and Skip(S, x), which skips the first x bytes of stream S. Using these two new operators, the above statement can be restated as, $$\text{vshiftstream}(S,y) \Rightarrow \text{Skip}(\text{vshiftstream}(\text{Prepend}(S,y), 0), y). \quad (1)$$

Consider now the Skip operation in Equation (1). In this equation, one always skips y<V bytes from a register stream with offset zero. (By definition, vshiftstream(Prepend(S,y),0) has an offset of zero.) Since a register stream is a sequence of V byte wide registers, skipping strictly less than V bytes from offset 0 never skips a whole register and thus has no effect on which registers to produce in a register stream. It only serves for bookkeeping purposes to maintain that the transformed stream has the same offset and length properties as the original stream. Thus, it can be safely ignored during the code generation phase.

For the Prepend operation in Equation (1), there are two cases to consider. When prepending to a memory stream, one simply subtracts x bytes from the memory address. Directly prepending to a register stream is not feasible. However, one can propagate Prepend operations to the leaves of an expression tree until memory streams are reached. Below we describe how to perform Prepend for each type of nodes in a data reorganization graph.

VLOAD(addr(i)) This node represents a vector load from a stride-one accesses addr(i). Therefore, $$\text{Prepend}(\text{VLOAD}(\text{addr}(i)), x) \Rightarrow \text{VLOAD}(\text{addr}(i)-x) \quad (2)$$

VOP($src_1, \ldots, src_n$) This node represents a generic operation that takes as input register streams associated with nodes $src_1, \ldots, src_n$ and produces one output register stream. (Generic operations represent all vectorizable operations except for the ones that shuffle values inside vector registers or the ones that convert data of different data sizes.) Thus, $$\text{Prepend(VOP}(src_1, \ldots, src_n), x) \Rightarrow \text{VOP} \\ (\text{Prepend}(src_1, x), \ldots, \text{Prepend}(src_n, x)) \quad (3)$$

VSHIFTSTREAM(src,to) This node shifts the register stream associated with the input node src to offset to, producing a register stream with a stream offset to. Thus, $$\text{Prepend(VSHIFTSTREAM}(src, to), x) \Rightarrow \text{VSHIFT-} \\ \text{STREAM(Prepend}(src, x), (to-x) \bmod V) \quad (4)$$

In FIG. 4, pseudocode for a shift normalization routine is depicted, where the function NormalizeStream recursively traverses the tree from the root of a data reorganization graph until all vshiftstream are normalized. Through an application of the routine depicted in FIG. 4, a data reorganization graph of the type described in EICHENBERGER may be transformed into a normalized graph in which all stream shifts have been replaced with left shifts. In this way, code may be generated in which the actual degree of misalignment between the data streams is not known until runtime.

2.4. Proof of Correctness

In this section, the correctness of two important equations in Section 2.3 is proved. The first theorem demonstrates the validity of sinking a prepend past a stream shift, i.e., Equation (4).

Theorem 1. The following equality holds for an arbitrary stream S and V-byte wide SIMD unit:

$$\text{Prepend(VSHIFTSTREAM}(S, to), x) = \text{VSHIFT-} \\ \text{STREAM}((S, x), (to-x) \bmod V)$$

Proof. As a preliminary step, the properties of Prepend(S,x) are first defined as functions of those of S. As x bytes are added at the head of the stream, the offset and length of the prepended stream becomes (Offset(S)−x)mod V and Length (S)+x, respectively. Similarly, the offset and length properties of VSHIFTSTREAM(S,to) becomes to and Length(S), respectively.

The equality of the two streams is now proven by demonstrating that they derive from the same register stream and have the same offset and length properties.

| | |
|---|---|
| Offset(Prepend(VSHIFTSTREAM(S,to),x)) | = (Offset(VSHIFTSTREAM(S,to)) − x) mod V |
| | = (to − x) mod V |
| Length(Prepend(VSHIFTSTREAM(S,to),x)) | = Length(VSHIFTSTREAM(S,to)) + x |
| | = Length(S) + x |
| Offset(VSHIFTSTREAM(Prepend(S,x),(to − x) mod V)) | = (to − x) mod V |
| Length(VSHIFTSTREAM(Prepend(S,x),(to − x) mod V) | = Length(S) + x |

□

Using Theorem 1, the validity of transforming arbitrary stream shift to stream shift left, i.e., Equation (1), can be demonstrated.

Theorem 2. A register stream S with arbitrary offset can be shifted to an arbitrary target offset to by (1) prepending to bytes to S, (2) shifting the resulting stream to offset zero, and (3) skipping the first to values of the resulting stream.

Proof. Since Skip is a reciprocal of Prepend, the following $S_1$=Skip(Prepend($S_1$,x),x) holds for any stream $S_1$ Let $S_1$ be VSHIFTSTREAM(S,to), it can be stated that $$\text{VSHIFTSTREAM}(S, to) = \text{Skip(Prepend(VSHIFT-} \\ \text{STREAM}(S, to), to), to).$$

Using Theorem 1 to permute Prepend and VSHIFT-STREAM, one obtains, $$\text{VSHIFTSTREAM}(S, to) = \text{Skip(VSHIFTSTREAM} \\ (\text{Prepend}(S, to), 0), to).$$

3. Alignment Handling for Length Conversion

For the purpose of describing a preferred embodiment of the present invention, the term "length conversion operation" is defined as any operation that converts a stream into a stream of a different length. The most common length conversion operations are type conversions between data of different sizes. When processing typecasts (as in the C programming language, which supports long and short "int" types, for example), the primary focus is on the data reorganization aspect of type conversion. Further data processing beyond data reorganization, such as sign extensions or floating point conversions, for example, can be handled by additional non-length-conversion vector operations.

Two types of length conversion operations are defined.

VPACK(S,f). This operation packs a stream S by a factor f, e.g., a conversion from 4 to 2 byte data types is a vpack with a factor of 2. The length of the packed stream is divided by f and its offset is represented as, $$\text{Offset(VPACK}(S, f)) = \text{Offset}(S)/f. \quad (5)$$

VUNPACK(S,f). This operation unpacks stream S by a factor f, e.g., conversion from 4 to 8 byte data types is a vunpack with a factor of 2. The of the unpacked stream is multiplied by f and its offset is, $$\text{Offset(VUNPACK}(S, f)) = \text{Offset}(S) * f. \quad (6)$$

Length conversions have a significant impact on the simdization framework. The rest of the section explains how to incorporate them into the three phases of the framework.

3.1. Data Reorganization Phase

The scaling effect of length conversion on stream offsets affects all but the least optimized Zero-shift alignment policy. The Zero-shift policy is not affected by length conversions because the scaling impact on an offset of value 0 still results in an offset of 0. As defined in Section 1.3 and the incorporated EICHENBERGER application (in the absence of length conversions), the Eager-shift policy shifts each misaligned load stream directly to the alignment of the store. In the presence of length conversions, the store alignment is still propagated to load nodes, but its alignment value is scaled up/down by the packing/unpacking factors when traversing length conversion nodes. (Since stream offsets are propagated from the store to the loads, in the reverse direction of the data flow, Equations (5) and (6) are used in the reverse direction.) Similarly in the Lazy-shift policy, the target shift offset is also scaled when moving stream shifts past a pack/unpack node, i.e., $$\text{VPACK(VSHIFTSTREAM}(S, to), f) = \text{VSHIFT-} \\ \text{STREAM(VPACK}(S, f), to/f)$$

$$\text{VUNPACK(VSHIFTSTREAM}(S, to), f) = \text{VSHIFT-} \\ \text{STREAM(VUNPACK}(S, f), to * f)$$

3.2 Stream Shift Normalization Phase

Figure 5:
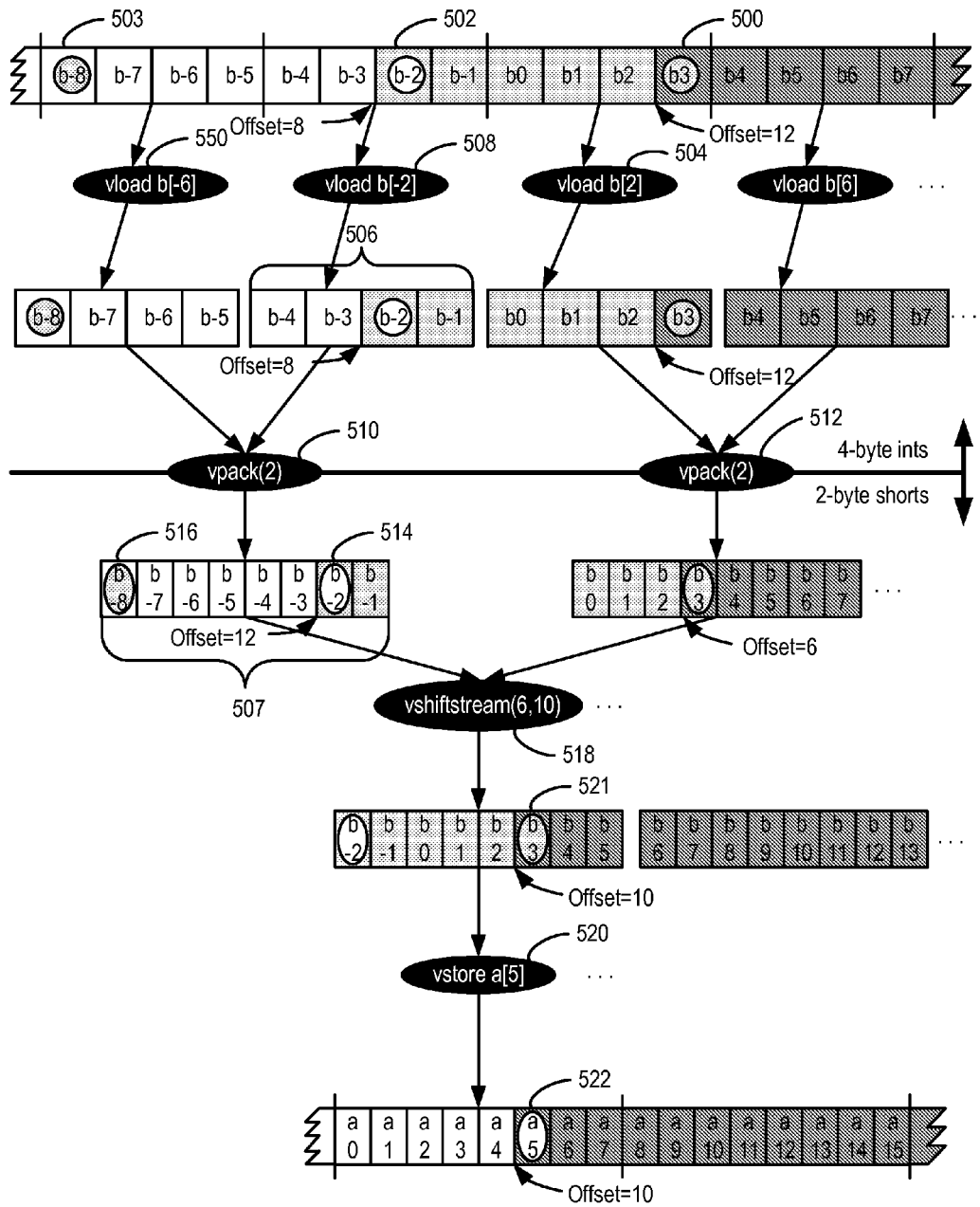
FIG. 5 is a diagram depicting a simdized loop in accordance with a preferred embodiment of the present invention, in which a type conversion between data types of different lengths is performed.

In the normalization phase, the implementation of Prepend is augmented to accommodate length conversions. Consider the example of a[i+5]=(short)b[i+3] where a is an array of short and b is an array of integer. FIG. 5 illustrates the streams of a valid simdization of the loop. Using the Prepend algorithm described in Section 2.3, the original b[i+3] memory stream (dark grey) starting at b[3] (value 500) is prepended by 20 bytes so as to start at b[−2] (value 502) (prepended values being displayed in light grey). When loading b[−2] (load operation 508) from memory, the SIMD load unit truncates the address at 16 byte boundaries and loads b[−4] . . . b[−1] (values 506). However, as shown in FIG. 5, because of packing node (vpack operation 510) between the load and the stream shift, the b[−8] . . . b[−1] values (values 507) are what are needed. (For clarity, this discussion focuses on the generation of the first batch of values in FIG. 5 as an illustration of what happens in the steady state. When processing the first (or last) batch of values, it is sometime possible to eliminate some of the computations (e.g., vload b[−6] operation 5550) that do not impact the final values that can legally be stored. However, no such elimination can occur in the steady state.)

The solution employed by a preferred embodiment of the present invention is to eliminate the dependence on address truncation that occurs at the memory operations by explicitly performing the desired truncation at the input stream of the stream shift operation. The solution is to further prepend the already prepended input stream of vshiftstream to the value that is at offset zero in the input register. For example, since the prepended input stream is b[−2] (values 502, 514), the stream is further prepended so that b[−8] (values 503, 516) is now the initial stream value. As can be visually seen from the figure by tracing the b[−8] value (value 516), the memory load truncation that used to occur at the load operation now occurs at the vicinity of shift stream operation 518, and is of the correct amount. The result may then be directly stored in the proper memory location for array "a" (store operation 520), with the result being truncated such that value 521 becomes the first value stored in array "a" (at value 522).

Theorem 3. In the presence of length conversion, a stream S can be shifted to an arbitrary target offset to by (1) prepending stream S by to+(Offset(S)−to)mod V bytes, (2) skipping the first (Offset(S)−to)mod V values of the resulting stream, (3) shifting the resulting stream to offset zero, and (4) skip to bytes of the shifted stream.

Note that, in Theorem 3, steps (1) and (3) produce streams of offset zero and in steps (2) and (4) the skip bytes are less than V. Therefore, the skips are only for bookkeeping purposes and can be safely ignored by code generation. Theorem 3 may be proved mathematically in a similar fashion to Theorem 2.

3.3. Code Generation Phase

During the code generation, vpack and vunpack are mapped to native permutation instructions. Some multimedia platforms even provide native packing and unpacking instructions to perform these operations, e.g., VMX. For machines where length conversions and stream shifts are both mapped to some sort of permutation instruction, the total number of extra permutation operations can be further reduced by merging together pairs of consecutive length conversion and stream shift.

4. Method Overview and Example Hardware Platform Description

Figure 6:
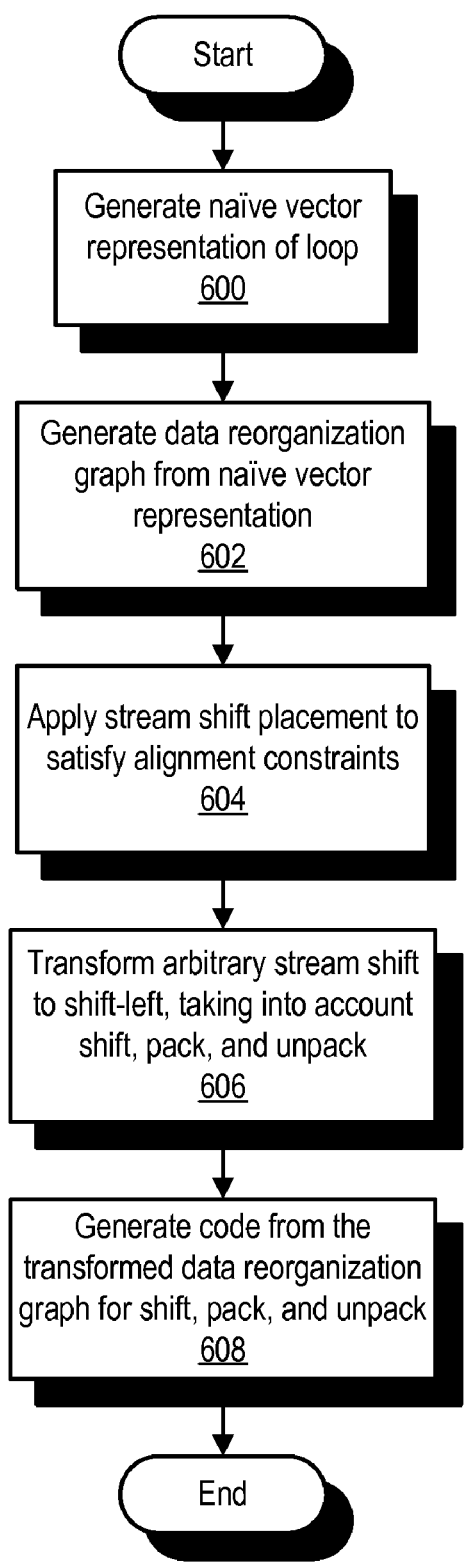
FIG. 6 is a flowchart representation of a process of vectorizing/simdizing a loop in accordance with a preferred embodiment of the present invention.

FIG. 6 is a flowchart representation of a process of simdizing a loop in accordance with a preferred embodiment of the present invention. First, a naïve vectorized representation of the loop is obtained without regard for the alignment or misalignment of the various memory streams involved (block 600). Next, a data reorganization graph is generated from the naïve vectorization (block 602). Then, stream shift operations are applied to the data reorganization graph to satisfy the data-alignment constraints of the loop (block 604). The arbitrary-direction shift operation are then converted into left shifts, taking into account not only the shift operations, but also any pack or unpack operations needed to handle datatype conversion (block 606). (Note: this conversion to left shifts may be omitted if the alignment constraints are completely known at compile time or if the above-described "zero-shift" policy is used.) Finally, code is generated from the transformed data reorganization graph, including code for shift, pack, and unpack operations (block 608).

Figure 7:
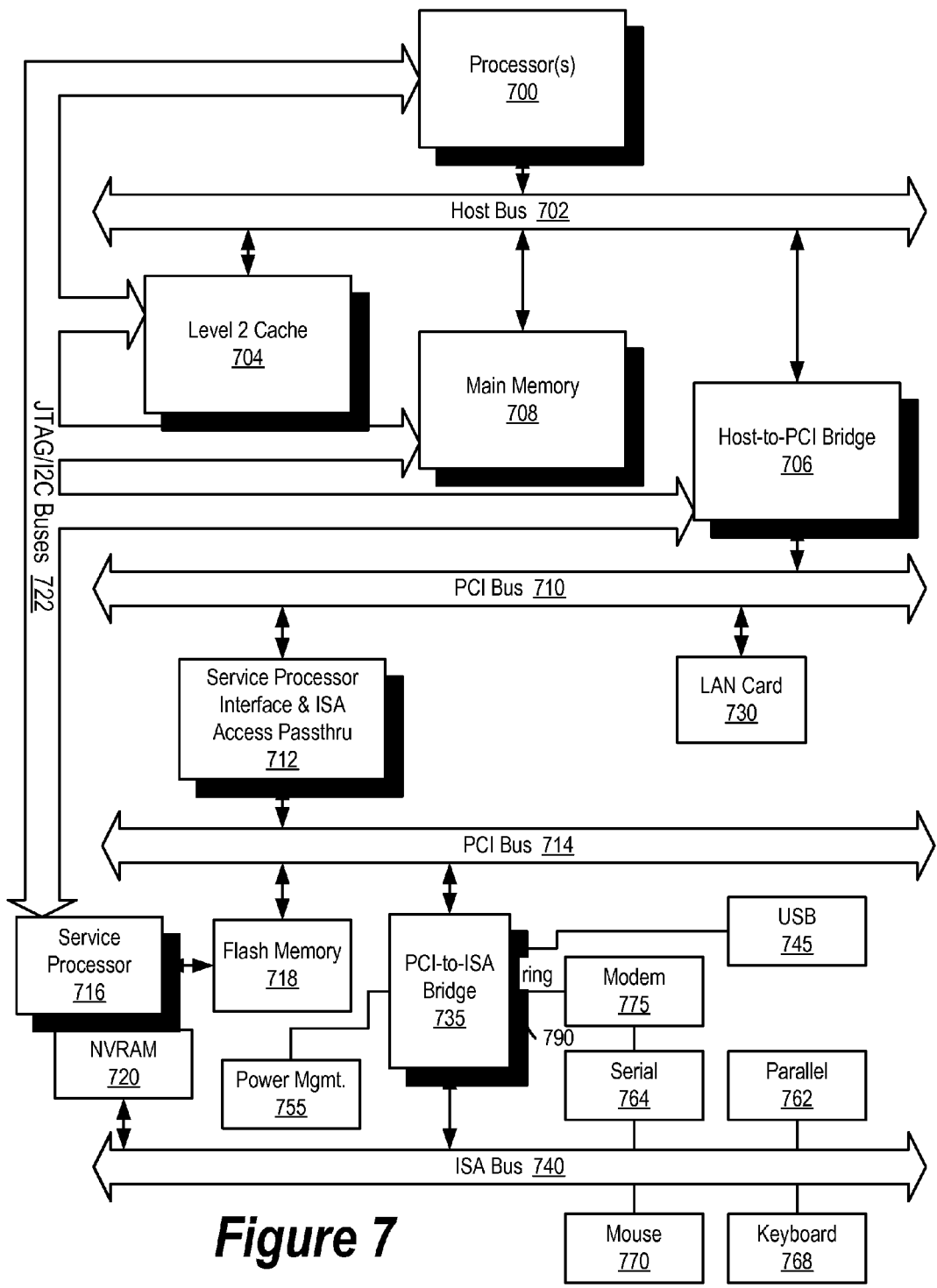
FIG. 7 is a block diagram of a computing device capable of implementing the present invention.

FIG. 7 illustrates information handling system 701 which is a simplified example of a computer system capable of performing the computing operations described herein. Computer system 701 includes processor 700 which is coupled to host bus 702. A level two (L2) cache memory 704 is also coupled to host bus 702. Host-to-PCI bridge 706 is coupled to main memory 708, includes cache memory and main memory control functions, and provides bus control to handle transfers among PCI bus 710, processor 700, L2 cache 704, main memory 708, and host bus 702. Main memory 708 is coupled to Host-to-PCI bridge 706 as well as host bus 702. Devices used solely by host processor(s) 700, such as LAN card 730, are coupled to PCI bus 710. Service Processor Interface and ISA Access Pass-through 712 provides an interface between PCI bus 710 and PCI bus 714. In this manner, PCI bus 714 is insulated from PCI bus 710. Devices, such as flash memory 718, are coupled to PCI bus 714. In one implementation, flash memory 718 includes BIOS code that incorporates the necessary processor executable code for a variety of low-level system functions and system boot functions.

PCI bus 714 provides an interface for a variety of devices that are shared by host processor(s) 700 and Service Processor 716 including, for example, flash memory 718. PCI-to-ISA bridge 735 provides bus control to handle transfers between PCI bus 714 and ISA bus 740, universal serial bus (USB) functionality 745, power management functionality 755, and can include other functional elements not shown, such as a real-time clock (RTC), DMA control, interrupt support, and system management bus support. Nonvolatile RAM 720 is attached to ISA Bus 740. Service Processor 716 includes JTAG and I2C buses 722 for communication with processor(s) 700 during initialization steps. JTAG/I2C buses 722 are also coupled to L2 cache 704, Host-to-PCI bridge 706, and main memory 708 providing a communications path between the processor, the Service Processor, the L2 cache, the Host-to-PCI bridge, and the main memory. Service Processor 716 also has access to system power resources for powering down information handling device 701.

Peripheral devices and input/output (I/O) devices can be attached to various interfaces (e.g., parallel interface 762, serial interface 764, keyboard interface 768, and mouse interface 770 coupled to ISA bus 740. Alternatively, many I/O devices can be accommodated by a super I/O controller (not shown) attached to ISA bus 740.

In order to attach computer system 701 to another computer system to copy files over a network, LAN card 730 is coupled to PCI bus 710. Similarly, to connect computer system 701 to an ISP to connect to the Internet using a telephone line connection, modem 775 is connected to serial port 764 and PCI-to-ISA Bridge 735.

While the computer system described in FIG. 7 is capable of executing the processes described herein, this computer system is simply one example of a computer system. Those skilled in the art will appreciate that many other computer system designs are capable of performing the processes described herein.

One of the preferred implementations of the invention is a client application, namely, a set of instructions (program code) or other functional descriptive material in a code module that may, for example, be resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive), or downloaded via the Internet or other computer network. Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps. Functional descriptive material is information that imparts functionality to a machine. Functional descriptive material includes, but is not limited to, computer programs, instructions, rules, facts, definitions of computable functions, objects, and data structures.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A computer program product stored on a computer storage media, the computer storage media containing instructions for execution by a computer, which, when executed by the computer, cause the computer to implement a method comprising:
   identifying a loop, which includes original operations, iterating over a plurality of continuous streams of memory in a stride-one fashion;
   generating a data reorganization graph from the loop, wherein the data reorganization graph tracks an absolute alignment of data for the plurality of continuous streams of memory, and wherein the data reorganization graph includes nodes and edges, the nodes being vector representations of the original operations and the edges representing operation results of the vector representations of the original operations;
   applying a shift placement policy to the data reorganization graph by inserting stream shift nodes in the data reorganization graph so as to satisfy alignment constraints of simdized operations, wherein the shift placement policy is selected from the group consisting of an eager shift policy, a lazy shift policy, and a dominant shift policy, the shift placement policy further comprising:
      wherein the eager shift policy shifts an output stream of each load operation directly to an alignment of a store operation using stream shift operations inserted in proximity to the load operation;
      wherein the lazy shift policy shifts the output stream of each of the load operations directly to the alignment of the store operation using the stream shift operations inserted in proximity to a root of the data reorganization graph while still adhering to the alignment constraints of each of the simdized operations; and
      wherein the dominant shift policy shifts the output stream of each of the load operations to a most dominant alignment in the data reorganization graph using the shift stream operations, and shifts data streams going into the store operation directly to the alignment of the store operation using the stream shift operations inserted in proximity to the store operation;
   identifying, at compile time, that one or more of the stream shift operations included in the data reorganization graph is configured to shift data in a direction that is based upon a runtime input; and
   in response to identifying that one or more of the stream shift operations included in the data reorganization graph is configured to shift the data in the direction that is based upon the runtime input, transforming, at compile time, the data reorganization graph into to a different data reorganization graph, the different data reorganization graph including modified stream shift operations that correspond to the one or more identified stream shift operations, wherein the modified stream shift operations shift the data in a direction independent of the runtime input.

2. The computer program product of claim 1 wherein one of the modified stream shift operations shifts the data to the left.

3. The computer program product of claim 2, wherein the transforming further comprises:
   causing one or more values to be prepended to the data prior to shifting the data, the prepending recursively propagating over the reorganization graph in order to normalize each of the modified stream shift operations to a shift left only operation.

4. The computer program product of claim 3, wherein the transforming further comprises:
   performing an operation on the data to obtain a result; and
   causing a corresponding one or more values from the result to be truncated from the result, wherein the corresponding one or more values correspond to the one or more values prepended to the data stream prior to shifting the data.

5. The computer program product of claim 1, wherein the method further comprises:
   interposing a data length conversion operation into the data reorganization graph, wherein the data length conversion operation represents a conversion from a data type having a first length to a data type having a second length, and where the ratio of the data lengths is taken into consideration while the prepending recursively propagates over the data reorganization graph in order to normalize each of the stream shift operations to a shift left only operation.

6. An information-handling system comprising:

at least one processor;

one or more data storage units accessible by the at least one processor; and functional descriptive material contained within the data storage units that, when executed by the at least one processor, directs the at least one processor to perform actions of:

identifying a loop, which includes original operations, iterating over a plurality of continuous streams of memory in a stride-one fashion;

generating a data reorganization graph from the loop, wherein the data reorganization graph tracks an absolute alignment of data for the plurality of continuous streams of memory, and wherein the data reorganization graph includes nodes and edges, the nodes being vector representations of the original operations and the edges representing operation results of the vector representations of the original operations;

applying a shift placement policy to the data reorganization graph by inserting stream shift nodes in the data reorganization graph so as to satisfy alignment constraints of simdized operations, wherein the shift placement policy is selected from the group consisting of an eager shift policy, a lazy shift policy, and a dominant shift policy, the shift placement policy further comprising:

wherein the eager shift policy shifts an output stream of each load operation directly to an alignment of a store operation using stream shift operations inserted in proximity to the load operation;

wherein the lazy shift policy shifts the output stream of each of the load operations directly to the alignment of the store operation using the stream shift operations inserted in proximity to a root of the data reorganization graph while still adhering to the alignment constraints of each of the simdized operations; and wherein the dominant shift policy shifts the output stream of each of the load operations to a most dominant alignment in the data reorganization graph using the shift stream operations, and shifts data streams going into the store operation directly to the alignment of the store operation using the stream shift operations inserted in proximity to the store operation;

identifying, at compile time, that one or more of the stream shift operations included in the data reorganization graph is configured to shift data in a direction that is based upon a runtime input; and in response to identifying that one or more of the stream shift operations included in the data reorganization graph is configured to shift the data in the direction that is based upon the runtime input, transforming, at compile time, the data reorganization graph into to a different data reorganization graph, the different data reorganization graph including modified stream shift operations that correspond to the one or more identified stream shift operations, wherein the modified stream shift operations shift the data in a direction independent of the runtime input.

7. The information handling system of claim 6 wherein one of the modified stream shift operations shifts the data to the left.

8. The information handling system of claim 7, wherein the transforming further comprises:

causing one or more values to be prepended to the data prior to shifting the data, the prepending recursively propagating over the reorganization graph in order to normalize each of the modified stream shift operations to a shift left only operation.

9. The information handling system of claim 8, wherein the transforming further comprises:

performing an operation on the data to obtain a result; and causing a corresponding one or more values from the result to be truncated from the result, wherein the corresponding one or more values correspond to the one or more values prepended to the data stream prior to shifting the data.

10. The information handling system of claim 6, wherein the actions further comprise:

interposing a data length conversion operation into the data reorganization graph, wherein the data length conversion operation represents a conversion from a data type having a first length to a data type having a second length, and where the ratio of the data lengths is taken into consideration while the prepending recursively propagates over the data reorganization graph in order to normalize each of the stream shift operations to a shift left only operation.

* * * * *